United States Patent
Park

(10) Patent No.: US 9,814,002 B2
(45) Date of Patent: Nov. 7, 2017

(54) APPARATUS AND METHOD FOR CONTROLLING TRANSMISSION POWER IN WIRELESS COMMUNICATION SYSTEM

(71) Applicant: Innovative Technology Lab Co., Ltd., Seoul (KR)

(72) Inventor: Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 0 days.

(21) Appl. No.: 15/207,399

(22) Filed: Jul. 11, 2016

(65) Prior Publication Data

US 2016/0323836 A1 Nov. 3, 2016

Related U.S. Application Data

(63) Continuation of application No. 14/708,026, filed on May 8, 2015, now Pat. No. 9,420,551.

(30) Foreign Application Priority Data

May 9, 2014 (KR) .................. 10-2014-0055899
Aug. 14, 2014 (KR) .................. 10-2014-0106286

(51) Int. Cl.
| | |
|---|---|
| *H04W 52/38* | (2009.01) |
| *H04W 52/24* | (2009.01) |
| *H04W 4/00* | (2009.01) |
| *H04W 8/00* | (2009.01) |
| *H04W 76/02* | (2009.01) |
| *H04W 52/02* | (2009.01) |
| *H04W 72/04* | (2009.01) |
| *H04W 52/32* | (2009.01) |

(52) U.S. Cl.
CPC ......... *H04W 52/383* (2013.01); *H04W 4/005* (2013.01); *H04W 8/005* (2013.01); *H04W 52/0229* (2013.01); *H04W 52/243* (2013.01); *H04W 52/325* (2013.01); *H04W 72/0473* (2013.01); *H04W 76/023* (2013.01); *H04W 52/32* (2013.01); *Y02B 60/50* (2013.01)

(58) Field of Classification Search
None
See application file for complete search history.

(56) References Cited

U.S. PATENT DOCUMENTS 9,179,454 B2 * 11/2015 Dinan ................. H04W 52/281
2014/0003262 A1 1/2014 He et al.
(Continued)

OTHER PUBLICATIONS

"3rd Generation Partnership Project; Technical Specification Group Radio Access Network; Evolved Universal Terrestrial Radio Access (E-UTRA); Physical layer procedures (Release 12)," 3GPP TS 36.213, Mar. 2014, pp. 1-186, V12.1.0, 3GPP Organizational Partners, Valbonne, France.
(Continued)

*Primary Examiner* — Rhonda Murphy

(57) ABSTRACT

Exemplary embodiments provide a method and apparatus for controlling transmit power for a device-to-device (D2D) communication between user equipments (UEs), the method including: searching for a peer UE; determining transmit power of a D2D communication signal to be transmitted to the peer UE; and transmitting the D2D communication signal to the peer UE based on the determined transmit power.

16 Claims, 4 Drawing Sheets

(56) References Cited

U.S. PATENT DOCUMENTS

2014/0219095 A1    8/2014  Lim et al.
2014/0302791 A1   10/2014  Mok et al.
2016/0142898 A1*   5/2016  Poitau ............... H04W 72/0413
                                                              370/329

OTHER PUBLICATIONS

"3rd Generation Partnership Project; Technical Specification Group Radio Access Network; Evolved Universal Terrestrial Radio Access (E-UTRA); Radio Resource Control (RRC) Protocol specification (Release 12)," 3GPP TS 36.331, Mar. 2014, pp. 1-356, V12.1.0, 3GPP Organizational Partners, Valbonne, France.

* cited by examiner

APPARATUS AND METHOD FOR CONTROLLING TRANSMISSION POWER IN WIRELESS COMMUNICATION SYSTEM

CROSS-REFERENCE TO RELATED APPLICATIONS

This application is a continuation of and claims priority to U.S. patent application Ser. No. 14/708,026, filed on May 8, 2015, which claims priority to Korean Patent Application Nos. 10-2014-0055899, filed on May 9, 2014, and 10-2014-0106286, filed on Aug. 14, 2014, all of which are hereby incorporated by reference in its entirety.

BACKGROUND

1. Field

Exemplary embodiments relate to a wireless communication, and more particularly, to a method and apparatus for controlling a transmit power in wireless communication system.

2. Discussion of the Background $3^{rd}$ Generation Partnership Project (3GPP) Long Term Evolution (LTE) uses an orthogonal frequency division multiple access (OFDMA) in a downlink and uses a single carrier-frequency division multiple access (SC-FDMA) in an uplink. Recently, discussion on 3GPP LTE-Advanced (LTE-A) corresponding to an evolved form of the 3GPP LTE is in progress.

Device-to-device (D2D) communication refers to a distributive communication technology that enables adjacent user equipments (UEs) to directly transfer traffic. In the D2D communication, a UE, such as a mobile phone, autonomously searches for another UE physically adjacent to the UE, sets up a communication session, and transmits traffic to the found UE. The D2D communication may outperform a traffic overloading issue by distributing traffic concentrated on an evolved NodeB (eNB). D2D communication technology, such as Bluetooth or wireless fidelity (Wi-Fi) direct, supports direct communication between radio nodes without using support of the eNB.

Controlling of transmit power is essential for D2D communication. The transmit power is required for interference mitigation and power saving. When the transmit power of a UE is relatively very low, a peer device may not readily receive data. On the contrary, when the transmit power of the UE is relatively very high, a large amount of interference may occur in another device. In addition, a significantly high transmit power may increase an amount of battery used.

SUMMARY

Exemplary embodiments provide a method and apparatus for controlling a transmit power for device-to-device (D2D) communication. An exemplary embodiment provides a method of controlling transmit power for a device-to-device (D2D) communication between user equipments (UEs), the method including: searching for a peer UE; determining transmit power of a D2D communication signal to be transmitted to the peer UE; and transmitting the D2D communication signal to the peer UE based on the determined transmit power.

An exemplary embodiment provides a user equipment (UE) to perform a device-to-device (D2D) communication with another UE, the UE including: a transceiver to transceive a wireless signal; and a processor connected to the transceiver. The processor searches for a peer UE, determines transmit power of a D2D communication signal to be transmitted to the peer UE, and transmit the D2D communication signal to the peer UE based on the determined transmit power.

According to one or more exemplary embodiments, it is possible to decrease an amount of interference against another system due to device-to-device (D2D) communication and to efficiently control the power consumption of a D2D UE.

DETAILED DESCRIPTION OF THE ILLUSTRATED EMBODIMENTS

Figure 1:
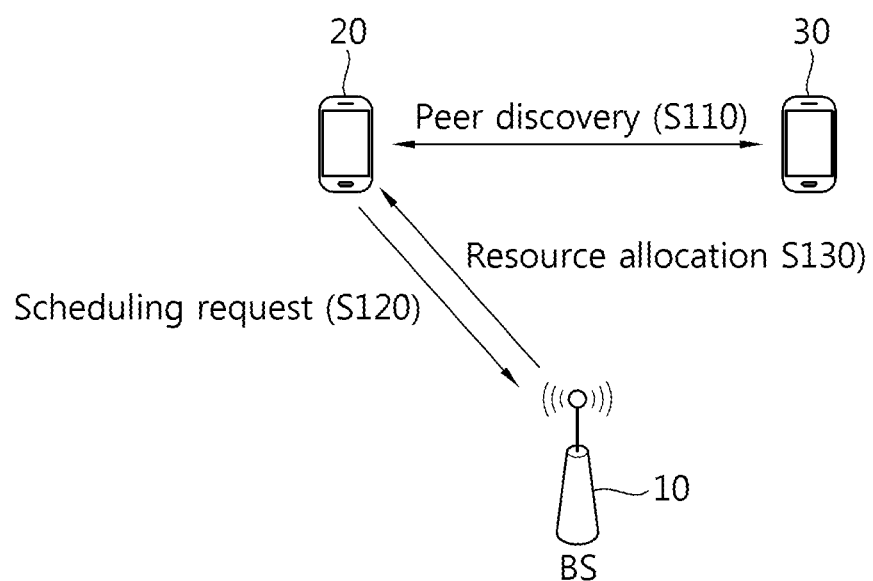
FIG. 1 illustrates device-to-device (D2D) communication, according to one or more exemplary embodiments.

Exemplary embodiments will be described more fully hereinafter with reference to the accompanying drawings, in which exemplary embodiments of inventive concept are shown. Throughout the drawings and the detailed description, unless otherwise described, the same drawing reference numerals are understood to refer to the same elements, features, and structures. In describing the exemplary embodiments, detailed description on known configurations or functions may be omitted for clarity and conciseness.

Further, the terms, such as first, second, A, B, (a), (b), and the like may be used herein to describe elements in the description herein. The terms are used to distinguish one element from another element. Thus, the terms do not limit the element, an arrangement order, a sequence or the like. It will be understood that when an element is referred to as being "on", "connected to" or "coupled to" another element, it can be directly on, connected or coupled to the other element or intervening elements may be present. Further, the description herein is related to a wireless communication network, and an operation performed in a wireless communication network may be performed in a process of controlling a network and transmitting data by a system that controls a wireless network (e.g., a base station) or may be performed in a user equipment connected to the wireless communication network.

User equipment (UE) may be located at a certain location or mobile, and may also be referred to as different terms, including MS (mobile station), UT (user terminal), SS (subscriber station), MT (mobile terminal), wireless device, PDA (personal digital assistant), wireless modem, and handheld device. A base station may also be referred to as eNB (evolved-NodeB), BTS (Base Transceiver System), Access Point, femto base station, Home nodeB, and relay. A cell inclusively refers to various coverage areas, such as mega cell, macro cell, micro cell, pico cell, and femto cell.

Hereinafter, a description is made by illustrating exemplary embodiments based on $3^{rd}$ Generation Partnership Project (3GPP), 3GPP Long Term Evolution (LTE), or 3GPP LTE-Advanced (LTE-A). However, it is only an example and the present invention may be applied to various wireless communication systems. Hereinafter, the term "LTE" includes LTE and/or LTE-A.

The term "subframe" refers to a resource allocation unit that includes a plurality of orthogonal frequency division multiplexing (OFDM) symbols. A data packet may be transmitted from one or more OFDM symbols within a subframe. An amount of time used to transmit a single subframe is referred to as a transmission time interval (TTI). For example, a length of a single subframe may be 1 ms. The subframe may include two slots. For example, when the subframe includes 14 OFDM symbols, each of the two slots may include 7 OFDM symbols.

Since the 3GPP LTE uses an orthogonal frequency division multiple access (OFDMA) in a downlink, an OFDM symbol is used to express a single symbol period in a time domain and thus, a multiple access method or name is not limited. For example, the OFDM symbol may be referred to as another name such as a single carrier-frequency division multiple access (SC-FDMA) symbol and a symbol period.

Hereinafter, a UL transmit power will be described.

A physical channel may be divided into a data channel, for example, a physical downlink shared channel (PDSCH) and a physical uplink shared channel (PUSCH), and a control channel, for example, a physical downlink control channel (PDCCH), a physical control format indicator channel (PCFICH), a physical hybrid-ARQ indicator channel (PHICH), and a physical uplink control channel (PUCCH).

Transmit power $P_{PUSCH}(i)$ for PUSCH transmission in a subframe i is defined as follows:

$$P_{PUSCH}(i) = \min \left\{ \begin{array}{l} P_{CMAX}, \\ 10\log_{10}(M_{PUSCH}(i)) + P_{O\_PUSCH}(j) + \\ \alpha(j)PL + \Delta_{TF}(i) + f(i) \end{array} \right\}$$ [Equation 1]

In Equation 1, $P_{CMAX}$ (denotes a maximum transmit power set to a UE and $M_{PUSCH}(i)$ denotes a bandwidth of PUSCH resource allocation of an RB unit. $P_{O\_PUSCH}(j)$ denotes a parameter including a summation of cell-specific element $P_{O\_NOMINAL\_PUSCH}(j)$ and UE-specific element $P_{O\_UE\_PUSCH}(j)$ together with each use purpose and configuration of j=0 and 1. $\alpha(j)$ denotes a parameter given to an upper layer, PL denotes a downlink pathloss estimation calculated by the UE, and $\Delta_{TF}(i)$ denotes a UE-specific parameter based on MCS information the UE is informed of f(i) denotes a UE-specific value indicated from a transmit power control (TPC) within a DCI format, and min{A,B} denotes a function of outputting a relatively small value between A and B.

j denotes a value given based on a channel. For example, j=0, 1, 2. If j=0, it may indicate semi-persistent scheduling (SPS), if j=1, it may indicate dynamic PUSCH scheduling, and if j=2, it may indicate random access channel (RACH) scheduling.

Transmit power $P_{PUCCH}(i)$ for PUCCH transmission in the subframe i is defined as follows:

$$P_{PUCCH}(i) = \min \left\{ \begin{array}{l} P_{CMAX,c}, \\ P_{0\_PUCCH} + PL_c + h(n_{CQI}, n_{HARQ}, n_{SR}) + \\ \Delta_{F\_PUCCH}(F) + g(i) \end{array} \right\}$$ [Equation 2]

In Equation 2, $P_{CMAX}$ and PL are defined as same as Equation 1, and $P_{O\_PUCCH}(j)$ denotes a parameter including a summation of cell-specific element $P_{O\_NOMINAL\_PUCCH}(j)$ and UE-specific element $P_{O\_UE\_PUCCH}(j)$ given from an upper layer. $h(n_{CQI}, n_{HARQ})$ denotes a value subordinate to the number of control information bits transmitted to a PUCCH format and a PUCCH, $\Delta_{F\_PUCCH}(F)$ denotes a parameter given from the upper layer and g(i) denotes a UE-specific value acquired from the TPC.

Hereinafter, a method of controlling a transmit power in D2D communication according to exemplary embodiments will be described.

In an LTE system, direct communication between UEs is disallowed and data communication is connected through an eNB. A method of supporting D2D communication without using the eNB or through least scheduling of the eNB is in consideration to distribute increasing data traffic and support the public safety.

FIG. 1 illustrates D2D communication, according to one or more exemplary embodiments.

Each of a first UE 20 and a second UE 30 sets up a connection, for example, a radio resource control (RRC) connection, with an eNB 10, for example, a base station (BS).

The first UE 20 and the second UE 30 are present in a communicable distance and perform peer discovery for identifying each other in operation S110. For the peer discovery, each of the first UE 20 and the second UE 30 may transmit a discovery signal and/or a sync signal including its own identification (ID) information. The first UE 20 and the second UE 30 may search for a discovery signal of a peer device periodically or in response to a request of the eNB 10.

Herein, only two UEs, for example, the first UE 20 and the second UE 30 are used, however, it is only an example. For clarity of description, an example in which the first UE 20 transmits data to the second UE 30 will be described.

In operation S120, the first UE 20 transmits, to the eNB 10, a scheduling request for transmission to the second UE 30. The scheduling request refers to information transmitted to inform the eNB 10 of a request for D2D data transmission from the first UE 20. Buffer state report (BSR) information may be transmitted using a resource allocated by the eNB 10.

When the first UE 20 performs D2D communication within coverage of the eNB 10, the eNB 10 transmits resource allocation information indicating available radio resources for D2D communication by the first UE 20 in a radio resource set or a resource pool provided for the D2D communication in operation S130. Here, the available radio resources for D2D communication may include resources available for D2D data transmission and resources available for scheduling assignment (SA). The resource allocation information may be transmitted to the first UE 20 through a PDCCH or an E-PDCCH.

Resource allocation information may be transmitted from the eNB 10 in response to a request of the first UE 20, however, it is only an example. The eNB 10 may transmit the resource allocation information to the first UE 20 and/or the second UE 30 irrespective of the request of the first UE 20.

Once resource allocation information is given, the first UE 20 may transmit a transmission signal to the second UE 30 through the available radio resource for D2D communication. For example, resource allocation information the eNB 10 informs a Tx UE of an eNB may include at least one transmission opportunity. Here, each transmission opportunity may include different time/frequency resources. The first UE 20 may transmit, to the second UE 30, scheduling assignment (SA) for delivering a data packet and control information about the data packet using the indicated at least one transmission opportunity.

D2D grant, for example, D2D data grant/D2D SA grant, information to be transmitted from an eNB may include information about a control of transmit power, which will be described below.

The following transmit power control method may be applied to transmission of a D2D SA (control signal), transmission of a D2D data packet, transmission of a D2D discovery signal, and transmission of a D2D sync signal in D2D communication.

Initially, the transmit power for a data channel in the subframe i may be determined as follows:

$$P_{D2D}(i) = \min\left\{\begin{array}{l} P_{CMAX,D2D}(i), \\ 10\log_{10}(M_{D2D}(i)) + P_{O\_D2D}(j) + \\ \alpha_{D2D}(j)PL_{D2D} + \Delta_{TF,D2D}(i) + f_{D2D}(i) \end{array}\right\} \quad \text{[Equation 3]}$$

In the subframe i, the transmit power for an SA channel may be determined as follows:

$$P_{D2D,SA}(i) = \min\left\{\begin{array}{l} P_{CMAX,D2D}(i), \\ P_{O\_D2D}(j) + \alpha_{D2D}(j)PL_{D2D} + f_{D2D}(i) \end{array}\right\} \quad \text{[Equation 4]}$$

The transmit power for a discovery channel or a sync channel in the subframe i may be determined as follows:

$$P_{D2D,DS}(i) = \min\left\{\begin{array}{l} P_{CMAX,D2D}(i), \\ P_{O\_D2D}(j) + \alpha_{D2D}(j)PL_{D2D} \end{array}\right\} \quad \text{[Equation 5]}$$

In Equation 3 through Equation 5, parameters may be defined as follows.

1. $P_{CMAX,D2D}$ $P_{CMAX,D2D}$ denotes a maximum transmit power set to a UE for D2D communication.

When the D2D communication is to be performed within coverage of an eNB, the eNB may determine the maximum transmit power based on interference and coverage of a D2D channel and may inform the UE of information, for example, information about $P_{CMAX,D2D}$, for determining $P_{CMAX,D2D}$. As one example, information about $P_{CMAX,D2D}$ may be transferred through a radio resource control (RRC) message or a medium access control (MAC) message.

As another example, information about $P_{CMAX,D2D}$ may be cell-specifically transmitted and may also be transmitted to a predetermined UE capable of supporting D2D communication through UE-specific signaling. As another example, for a D2D UE operating in multiple carriers, when D2D transmission on one carrier and WAN transmission, for example, exiting LTE channel transmission, on another carrier occur in the same subframe, or when D2D transmission on one carrier and D2D transmission on another carrier occur, the D2D maximum transmit power ($P_{CMAX,D2D,c} = P_{CMAX,c} - P_{PUSCH,d}$ (or $P_{PUCCH,d}$)) transmitted in a serving cell c in which D2D transmission is to be performed may be determined as the maximum transmit power for a D2D signal that is determined using the power remaining by preferentially considering existing LTE channels. for example, a PUSCH and a PUCCH, transmittable in another serving cell d.

In addition, even when still another D2D transmission transmittable in the serving cell d occurs, the D2D maximum transmit power ($P_{CMAX,D2D,c} = P_{CMAX,c} - P_{D2D,d}$) may be calculated in a similar manner.

Here, it is assumed that a D2D signal to be transmitted in the serving cell d has a relatively high priority compared to a D2D signal indicated to be transmitted in the serving cell c. The priority may be determined based on characteristics of a D2D channel and mode/type. For example, a SA transmission of Mode 1 may have precedence over a data transmission or a SA transmission of Mode 2. However, it is only an example and the present invention is not limited thereto.

Further, in the above example, when a value of D2D maximum transmit power $P_{CMAX,D2D,c}$ in the serving cell c is negative or less than a required value due to a relatively high transmit power of channel signals, that is, WAN or other D2D signals, transmitted in the serving cell d, the corresponding D2D transmission in the serving cell c may be dropped.

$P_{CMAX}$ and $P_{CMAX,D2D}$ for the PUSCH/PUCCH in Equation 1 and Equation 2 may be set to the same value. For example, when the serving cell c is assumed as a D2D supportable serving cell, $P_{CMAX,D2D}(i)$ may have the same value as $P_{CMAX}(i)$ calculated by a UE for LTE WAN transmission. However, it is assumed that $P_{CMAX,D2D}(i)$ for transmitting a D2D signal cannot be greater than a $P_{CMAX}$ value for LTE WAN transmission.

When D2D communication is to be performed outside the coverage of the eNB or at the edge of the eNB, $P_{CMAX,D2D}$ may be used as a preset value. As an example, a value preset using a sync signal or a discovery signal may be transferred to a peer device during a peer discovery process, or a value preset by the eNB may be used as is. As another example, when D2D communication or discovery is to be performed with a UE within partial coverage, a preset value may be transferred to a UE outside the coverage through a physical D2D synch channel (PD2DSCH) during a synchronization process.

2. $M_{D2D}(i)$ $M_{D2D}(i)$ denotes a parameter given from a radio resource for D2D communication and may be in proportion to the number of physical resource blocks (PRBs). A PRB may refer to a basic resource allocation unit. For example, $M_{D2D}(i)$ may denote the number of RBs for D2D communication or a bandwidth for D2D communication in a subframe i.

Other D2D channels or signals excluding a D2D data channel may be determined to use PRBs (for example, 1 or 2 PRB-pairs) that are fixed in terms of a frequency. However, the D2D data channel may use various sizes of PRBs for data transmission through resource allocation, for example, a D2D data grant or scheduling assignment (SA). That is, $M_{D2D}(i)$ may have a variable value with respect to a data channel for D2D communication and may have a value of 0 or a fixed value with respect to other D2D signals/channels.

3. $P_{O\_D2D}(j)$ $P_{O\_D2D}(j)$ denotes a basic transmit or operation power of a UE for D2D communication.

According to an embodiment, the parameter $P_{O\_D2D}(j)$ may be set to a summation of cell-specific power control set value $P_{O\_NOMINAL\_D2D}(j)$ and UE-specific power control set value $P_{O\_UE\_D2D}(j)$. In particular, $P_{O\_UE\_D2D}(j)$ may be differently given based on a transmission type, for example, broadcasting, groupcasting, and unicasting, for D2D communication.

As one example, $P_{O\_UE\_D2D}(j)$ may be replaced with $P_{O\_Broadcasting\_D2D}(j)$ for broadcasting, $P_{O\_Groupcast\_D2D}(j)$ for groupcasting, or $P_{O\_Unicast\_D2D}(j)$ for unicasting. That is, $P_{O\_UE\_D2D}(j)$ may be determined based on a value given according to a transmission type, for example, $P_{O\_BROADCAST\_D2D}(j)$, $P_{O\_GROUPCAST\_D2D}(j)$, or $P_{O\_UNICAT\_D2D}(j)$. Here, $P_{O\_BROADCAST\_D2D}(j)$, $P_{O\_GROUPCAST\_D2D}(j)$, and $P_{O\_UNICAT\_D2D}(j)$ may be informed by the eNB to the UE through RRC signaling, or may be a predetermined value. Alternatively, the Tx UE may dynamically select $P_{O\_UE\_D2D}(j)$ based on a characteristic, for example, broadcasting, groupcasting, or unicasting, of corresponding data transmission within scheduling information through predetermined values or RRC signaling indicated by the eNB, and may use the selected $P_{O\_UE\_D2D}(j)$ for controlling the transmit power of a D2D signal. Here, in the case of D2D communication, a value of j may be fixed to a predetermined value. For example, j may be fixed to '0', that is, j=0. By applying, to transmission of the D2D channel, the case of j=0 used to support the existing UL SPS communication, it is possible to decrease the configuration complexity and to decrease signal overhead and delay.

As another example, j for D2D communication may be separately defined. In the existing LTE, j=0, 1, 2. Thus, j=3 or another value may be used for D2D communication. That is, with respect to j that determines $P_{O\_UE\_D2D}(j)$ and $P_{O\_NOMINAL\_D2D}(j)$, values of j=3, 4, 5 may be added based on a transmission type in addition to the existing values of j=0, 1, 2. For example, j=3 may be set for broadcasting, j=4 may be set for groupcasting, and j=5 may be set for unicasting. Alternatively, since it is a parameter different from an existing parameter, it may be defined as a parameter indicating that j=0 is for D2D communication and j=1 is for D2D communication scheduled using an SPS transmission method.

According to another embodiment, the parameter $P_{O\_D2D}(j)$ may be determined as a single value set by the eNB or may be a predetermined value. That is, $P_{O\_D2D}(j)$ may not be set to a summation of cell-specific parameter $P_{O\_NOMINAL\_D2D}(j)$ and UE-specific parameter $P_{O\_UE\_D2D}(j)$, and instead, may be set to a direct UE-specific power control value. Here, j that determines $P_{O\_UE\_D2D}(j)$ may be defined as a value up to j=3, 4, 5.

4. $\alpha_{D2D}(j)$ $\alpha_{D2D}(j)$ denotes a parameter for compensation of pathloss (PL). In the LTE, if j=0 or 1, $\alpha_{D2D}(j)$ is set to $\alpha(j) \in [0, 0.4, 0.5, 0.6, 0.7, 0.8, 0.9, 1]$ by the eNB. For example, if j=2, $\alpha(j)=1$.

$\alpha_{D2D}(j)$ may be set by the eNB or a predetermined value based on the aforementioned new j set for D2D communication. For example, $\alpha_{D2D}(j)$ may be fixed to $\alpha_{D2D}(j)=1$.

5. $PL_{D2D}$ $PL_{D2D}$ denotes a value estimated as pathloss by the UE. The UE may estimate $PL_{D2D}$ through filtering of reference signal received power (RSRP) acquired from a discovery signal received from a peer UE. Alternatively, $PL_{D2D}$ may be calculated using an operation based on pathloss of a link between the eNB and a Tx UE.

As described above, the pathloss of each serving cell may be calculated based on PL,c=referenceSignalPower−higher layer filtered RSRP. Associated parameters are values for a reference serving cell. However, while a D2D UE operates on a deactivated carrier as if the D2D UE is an idle UE, LTE WAN communication may be performed on an activated carrier. For example, the D2D UE performs LTE WAN communication in an RRC configured and activated serving cell c and may concurrently perform D2D communication in a serving cell d in which the D2D UE operates in an idle mode. For reference, although the serving cell c and the serving cell d are set as carrier aggregation (CA) with respect to the aforementioned LTE WAN and D2D operation on multiple carriers. the proposed method may be applied alike even in a case in which the serving cell d is deactivated. In this case, the eNB needs to provide the corresponding D2D UE with a reference serving cell for a pathloss value calculated for controlling the transmit power of the D2D signal. Unless the reference serving cell is provided, the corresponding D2D UE may not acquire a pathloss value due to the absence of a reference serving cell indication for a deactivated serving cell and thus, may not perform accurate D2D signal transmission or interference mitigation about the LTE WAN. Accordingly, as a method of calculating a pathloss value of a carrier in which the D2D UE performs D2D communication, for example, Mode 2 communication and Type 1/2B discovery, in an idle mode, exemplary embodiments disclose a method of transmitting set values for the above upper layer parameter referenceSignalPower and upper layer filtering RSRP through signaling in a form of system information, for example, SIM on a carrier. According to still another embodiment, not a carrier in which the corresponding D2D UE performs D2D in an idle mode but an active carrier in which LTE WAN communication is performed may be assumed as a reference serving cell for calculating a pathloss value of a carrier. Alternatively, by considering that PCell (or PCell/pSCell (primary SCell) when a dual connection is set to the D2D UE) is activated at all times, PCell or pSCell may be assumed as a reference serving cell. According to still another embodiment, the eNB may inform the UE of parameter information, for example, set values for the upper layer parameter referenceSignalPower and the upper layer filtering RSRP, or information, for example, pathlossReferenceLinking for D2D carrier, indicating the reference serving cell through RRC signal of PCell.

6. $\Delta_{TF,D2D}(i)$

The UE-specific parameter $\Delta_{TF,D2D}(i)$ for a D2D data channel may be determined as follows:

$$\Delta_{TF,D2D}(i)=10 \log_{10}\{(2^{BRRE \cdot K_s}-1) \cdot \beta_{offset}^{D2D}\} \quad \text{[Equation 6]}$$

In Equation 6, BPRE denotes the number of bits per RE and is determined based on a modulation and coding scheme (MCS). That is, the BPRE is determined dependent on the MCS, and as a result, $\Delta_{TF,D2D}(i)$ is also determined dependent on the MCS. For example, the BPRE may be determined as follows:

$$BPRE = \sum_{r=0}^{C-1} K_r / N_{RE} \quad \text{[Equation 7]}$$

In Equation 7, C denotes the number of code blocks and $K_r$ denotes the number of coded bits per code block.

$N_{RE}$ denotes the number of REs within an RB allocated to the corresponding D2D data channel and may be calculated according to $N_{RE}=Msc \times N_{sym}$. Here, Msc denotes the number of REs allocated to an early D2D data channel, and $N_{sym}$ denotes the number of OFDM symbols allocated to the early D2D data channel and may be calculated according to $N_{sym}=2(N_{sym,UL}-1)-N_{GP}-N_{RS}$. Here, $N_{sym,UL}$ denotes the number of OFDM symbols per slot and $N_{RS}$ denotes the number of OFDM symbols used for a reference signal when the reference signal is set for the D2D data channel. Unless the reference signal is set, $N_{RS}=0$. $N_{GP}$ denotes the number of OFDM symbols used for a guard period (GP) on the D2D data channel. Unless the reference signal is set, $N_{GP}=0$.

If other control information is carried piggyback on the D2D data channel $\beta^{D2D}_{offset}$ may be set to a value less than 1. Otherwise, $\beta^{D2D}_{offset}$ may be set to a fixed value, for example, 1.

$\Delta_{TF,D2D}(i)$ may be used only for the D2D data channel and may not be applied to other channels/signals.

7. $f_{D2D}(i)$ $f_{D2D}(i)$ denotes a parameter determined based on a power adjustment value $\delta_{D2D}$ acquired from a transmit power command (TPC).

In the existing LTE, two modes are used to determine $\delta_{D2D}$. The two modes include an accumulation mode adjusted based on an accumulation value and an absolute mode adjusted by indicating an absolute value.

Although the above two modes are applicable to D2D communication, proposed is a method of using only the absolute mode. The accumulation mode is efficient when a single grant is applied to a single data channel. However, in the D2D communication, a plurality of data channels and/or a plurality of discovery signals may be transmitted based on a single grant indicating a resource allocation.

In the absolute mode, $f_{D2D}(i)=\delta_{D2D}(i-K_{D2D})$. That is, $f_{D2D}$ in the subframe i may be determined based on $\delta_{D2D}$ acquired from a TPC field included in a grant received from a subframe $i-K_{D2D}$. $K_{D2D}$ may have a value of 4 or more. The following Table 1 shows an example of $\delta_{D2D}$ acquired from a 2-bit TPC field.

TABLE 1

| TPC Field | $\delta_{D2D}$ [dB] |
|---|---|
| 0 | −4 |
| 1 | −1 |
| 2 | 1 |
| 3 | 4 |

Additionally, when the eNB sets, through upper layer signaling, the D2D UE to operate in the accumulation through DCI format 0 or 3/3A, the D2D UE may operate in the following manner. When the subframe i in the serving cell c is a subframe for D2D transmission, a power control state a for D2D transmission in the subframe i is adjusted using a PDCCH or EPDCCH in response to a TPC command received from the eNB. Here, the D2D UE independently calculates power control accumulation values for channels transmitted in D2D subframes and LTE WAN subframes.

$$f_c(i)=f_c(i-1)+\delta_{PUSCH,c}(i-K_{PUSCH}) \quad \text{[Equation 8]}$$

$$f_{c,D2D}(i)=f_{c,D2D}(i-1)+\delta_{D2D,c}(i-K_{D2D}) \quad \text{[Equation 9]}$$

Equation 8 shows a process of adding the transmit power control command $\delta_{PUSCH,c}(i-K_{PUSCH})$ for current LTE WAN transmission to previous accumulation value $f_c(i-1)$. Here, the above operation operates only in LTE WAN subframes. That is, a transmit power control command value, $\delta_{D2D,c}(i-K_{D2D})$, indicated by a D2D grant is not used for a power value for WAN transmission. Further, Equation 9 indicating an accumulating operation for D2D transmit power is executed based on a transmit power control command provided from the D2D grant indicated for D2D transmission only in the D2D subframes. Accordingly, the D2D UE may minimize interference against LTE WAN reception, for example, a PUCCH, at the eNB by further effectively controlling the D2D transmit power through an operation of accumulating two transmit powers for the D2D transmission and the LTE WAN transmission.

According to still another embodiment, it is possible to perform a power control using only Equation 8. That is, the power control may be performed by sharing the transmit power without defining different power control adjustment states for LTE transmission and D2D transmission. The description related thereto may be made with reference to FIG. 2.

Here, if the subframe i is a D2D subframe, $f_{c,D2D}(i)$ denotes a current D2D power control adjustment state. If the subframe is an LTE WAN subframe, $f_c(i)$ denotes a current LTE WAN transmit power control adjustment state. Through the subframe and upper layer signaling together with the above definition, one of the two modes, for example, the accumulation mode and the absolute mode, may be set for the LTE WAN transmission and one of the two modes may be set for the D2D transmission. Accordingly, four combinations may be generated for a single power control adjustment state. A method of calculating a power control adjustment state value may vary based on a subframe and a power control mode set for the subframe, for example, the subframe i. For example, when a power control mode for D2D transmission and a power control mode for LTE WAN transmission are set as the accumulation mode, accumulation may be performed as expressed by Equation 8 irrespective of whether the subframe is for the D2D transmission or for the LTE WAN transmission. For example, a subframe i−1 corresponds to a D2D subframe and thus, $f_c(i-1)$ may be calculated by adding up a TPC command indicated through a D2D grant. On the contrary, as expressed by the following equation, in the case of the subframe i for LTE WAN transmission, $f_c(i)=f_c(i-1)+\delta_{PUSCH,c}(i-K_{PUSCH})$ may be calculated by adding up a TPC command indicated through a grant for LTE WAN transmission.

Figure 2:
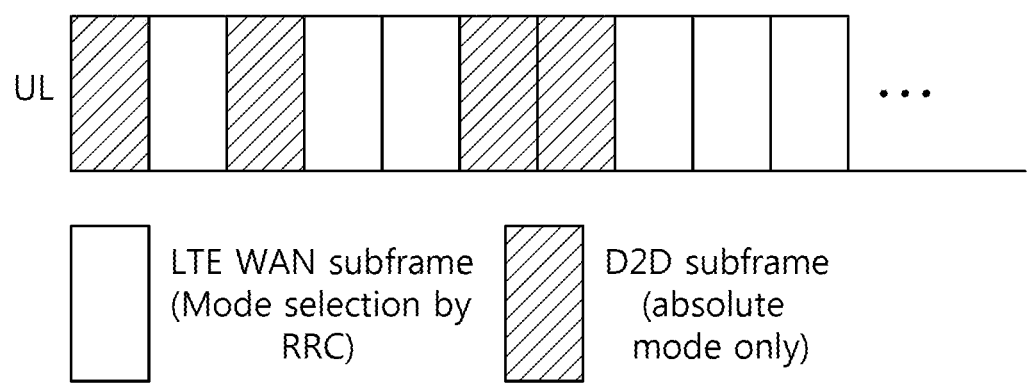
FIG. 2 is a format to describe a power control method, according to one or more exemplary embodiments.

Alternatively, according to still another embodiment, only the absolute mode may be allowed in the D2D subframe, and the accumulation mode and the absolute mode may be indicated through upper layer signaling in the LTE WAN subframe (see FIG. 2).

This method uses a single power control state adjustment value for D2D transmission and LTE transmission. Thus, when embodying the method, it is possible to further easily and effectively control the power of transmit signals having different purposes. Although this method may have a relatively degraded flexibility compared to the above-proposed method of using an independent power control state adjustment value, this method may be easily configured in a UE by appropriately adjusting other power control parameters and may minimize interference against LTE WAN reception from D2D transmission.

Further, in Equation 9, a value of $K_{D2D}$ defines a D2D grant and an amount of time, for example, a subframe unit, to be defined between SA and data transmission. As described above, basically, $K_{D2D} \geq 4$. However, for further clarity, $K_{D2D}$ may be defined as follows.

D2D grant—SA transmission:

$K_{D2D}$: As a first example, a value of $K_{D2D}$ may be set to 4 in FDD. In TDD, a value of $K_{D2D}$ may be set based on TDD UL-DL setting of a corresponding serving cell using the following Table 2. When serving cells are set as TDD carrier aggregation (CA) and different serving cells are set, TDD-FDD CA may be set. When a serving cell is a TDD or corresponds to a serving cell in which enhanced Interference Management and Traffic Adaptation (eIMTA) is set, the definition may be made using UL-reference UL-DL setting and the following Table 2.

Alternatively, if a Time domain Resource Pattern for Transmission (T-RPT) for SA transmission is defined, a resource for SA transmission using a D2D grant may be indicated using the T-TRP. Accordingly, when it is indicated from the D2D grant, $K_{D2D}$ may denote the number of subframes between a subframe in which the initial SA transmission indicated by the T-RPT and a subframe in which the D2D grant is transmitted.

Alternatively, $K_{D2D}$ may denote the number of subframes between a first subframe within a SA resource pool and the D2D grant.

TABLE 2

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

Table 2 shows $K_{PUSCH}$ with respect to TDD configuration 0-6.

D2D grant—D2D data transmission:

$K_{D2D}$: When a T-RPT for D2D data transmission is indicated for data transmission using the D2D grant, $K_{D2D}$ may denote the number of subframes between a subframe in which the initial data transmission indicated by the T-RPT and a subframe in which the D2D grant is transmitted.

Alternatively, according to another embodiment, $K_{D2D}$ may denote the number of subframes between a first subframe within a data resource pool for D2D data transmission and the D2D grant.

The aforementioned SA/data resource pool denotes a set of resources allowed by the eNB for SA/data transmission. A method of indicating a resource pool based on a D2D mode and a type of a UE and whether the corresponding UE performs D2D communication in a serving cell in an RRC connected mode or whether the UE performs D2D communication in the serving cell in an RRC idle mode may be indicated through dedicated RRC signaling.

Additionally, a condition for resetting a value $f_{c,D2D}(*)$ accumulated in the serving cell c needs to be defined. In one or more exemplary embodiments, when D2D communication is set in the serving cell c and $P_{O\_UE\_D2D,c}$ for D2D transmit power control proposed herein varies through upper layer signaling, or when $\alpha_{D2D}(j)$ varies through upper layer signaling, or when a predetermined RSRP threshold is set and an RSRP value measured through a reference signal transmitted from the eNB during a predetermined period is greater than or less than the RSRP threshold through comparison therebetween, the UE needs to reset an accumulation value for power control corresponding to $f_{c,D2D}(*)$ for the serving cell c.

Additionally, although D2D transmission (SA/data) is absent in the subframe i in the serving cell c, the D2D UE needs to assume the transmit power based on the following Equation 10 for accumulation of a TCP command indicated from DCI format 3/3A.

$$P_{D2D,c}(i) = \min \{P_{CMAX,c}(i), P_{O\_D2D}(1) + \alpha_c(1) \cdot PL_c + f_c(i)\} \quad [\text{Equation 10}]$$

When performing the D2D transmission in the same manner as an SPS is activated, additional $P_{O\_D2D,c}(2)$ and $\alpha_c(2)$ different from $P_{O\_D2D,c}(1)$ and $\alpha_c(1)$ may be indicated through upper layer signaling. In this example, when the existing $P_{O\_D2D,c}(1)$ and $\alpha_c(1)$ are for performing general D2D transmission, that is, SA and data transmission based on the D2D grant, $P_{O\_D2D,c}(2)$ and $\alpha_c(2)$ are values applicable when performing the D2D transmission, for example, SA and data transmission, in the same manner as an SPS is activated. Accordingly, a cell-specific transmit power value $P_{O\_D2D,c}(2)$ and a cell-specific pathloss compensation value $\alpha_c(2)$ applicable based on different scheduling methods, for example, one being a dynamic grant and the other being an SPS based scheduling, may be determined.

Further, the maximum transmit power $P_{CMAX,c}(i)$ on the serving cell c for controlling the power of the D2D communication needs to be defined. When actual D2D transmission is absent irrespective of indication through DCI format 3/3A in the subframe frame i for D2D transmission, the UE may calculate the maximum transmit power $P_{CMAX,c}(i)$ by using the assumption such as MPR=0 dB, A-MPR=0 dB, P-MPR=0 dB, and TC=0 dB.

Figure 3:
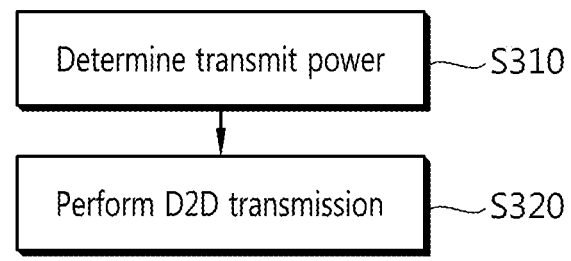
FIG. 3 is a flowchart illustrating a method of controlling a transmit power, according to one or more exemplary embodiments.

FIG. 3 is a flowchart illustrating a method of controlling a transmit power, according to one or more exemplary embodiments.

In operation S310, a UE determines a power, that is, a transmit power for transmitting a signal to a peer UE. For example, the transmit power may be determined according to embodiments disclosed herein.

Specifically, when the serving cell c is assumed as a D2D supportable serving cell, $P_{CMAX,D2D}(i)$ may have the same value as $P_{CMAX}(i)$ calculated by a UE for LTE WAN transmission. However, it is assumed that $P_{CMAX,D2D}(i)$ for transmitting a D2D signal cannot be greater than a $P_{CMAX}$ value for LTE WAN transmission.

Other D2D channels or signals excluding a D2D data channel may be determined to use PRBs (for example, 1 or 2 PRB-pairs) that are fixed in terms of a frequency. However, the D2D data channel may use various sizes of PRBs for data transmission through resource allocation, for example, a D2D data grant or scheduling assignment (SA). That is, $M_{D2D}(i)$ may have a variable value with respect to a data channel for D2D communication and may have a value of 0 or a fixed value with respect to other D2D signals/channels.

According to another embodiment, the parameter $P_{O\_D2D}(j)$ may be determined as a single value set by the eNB or may be a predetermined value. That is, $P_{O\_D2D}(j)$ may not be set to a summation of cell-specific parameter $P_{O\_NOMINAL\_D2D}(j)$ and UE-specific parameter $P_{O\_UE\_D2D}(j)$, and instead, may be set to a direct UE-specific power control value. Here, j that determines $P_{O\_UE\_D2D}(j)$ may be defined as a value up to j=3, 4, 5.

$\alpha_{D2D}(j)$ may be set by the eNB or a predetermined value based on the aforementioned new j set for D2D communication. For example, $\alpha_{D2D}(j)$ may be fixed to $\alpha_{D2D}(j)=1$.

$PL_{D2D}$ may be calculated using an operation based on pathloss of a link between the eNB and a Tx UE.

In operation S320, the UE performs D2D transmission based on the determined transmit power. Here, the D2D transmission includes transmitting, to the peer UE, at least one of a D2D data channel, a D2D scheduling allocation channel, a D2D discovery, and a D2D synchronization channel signal.

Figure 4:
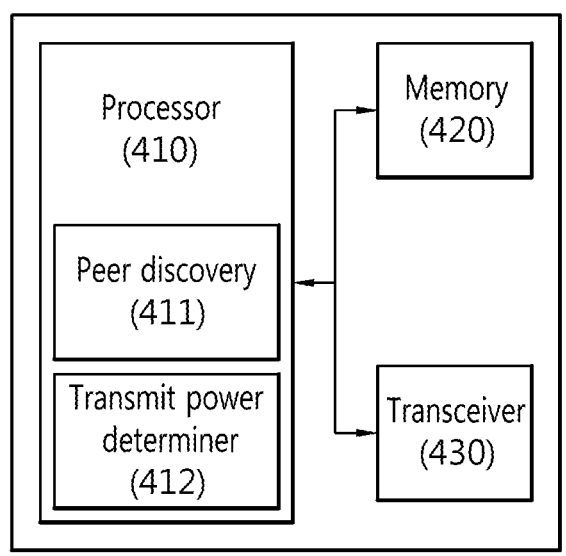
FIG. 4 is a block diagram illustrating a user equipment (UE), according to one or more exemplary embodiments.

FIG. 4 is a block diagram illustrating a UE, according to one or more exemplary embodiments.

The UE 400 may include a processor 410, a memory 420, and a transceiver 430.

The processor 410 determines the transmit power according to the embodiment of FIG. 3. The memory 420 stores a command for an operation of the processor 410. The stored command may be executed by the processor 410 and may be configured so that the operation of the UE 400 may be performed. The transceiver 430 may transmit a D2D channel and/or a D2D signal.

For example, the processor 410 includes a peer discovery 411 and a transmit power determiner 412. The peer discovery 411 performs a peer discovery for discovering a peer UE. The transmit power determiner 412 determines a transmit power for the peer UE discovered by the peer discovery 411. The transceiver 430 transmits a D2D signal to the peer UE based on the transmit power determined by the transmit power determiner 412.

The processor 410 may control transmit power for a D2D communication between UEs. The processor 410 may generate a discovery signal and control the transceiver to transmit the discovery signal. The peer discovery 411 may search for a peer UE, and the transmit power determiner 412 may determine transmit power of a D2D communication signal to be transmitted to the peer UE. Then, the transceiver 430 may transmit the D2D communication signal to the peer UE based on the determined transmit power. The discovery signal may be a D2D communication signal for searching for the peer UE. As a data communication between the UEs, a D2D communication signal including a data channel may be transmitted to the peer UE.

The transmit power may be determined based on a D2D signal transmission type, and the D2D signal transmission type may include broadcasting, group casting, and unicasting. Further, the transmit power may be determined based on a bandwidth used for transmitting the D2D signal. The transceiver 430 may receive, from an evolved NodeB, a radio resource allocation for the D2D communication signal.

The processors may include an application-specific integrated circuit (ASIC), another chipset, a logic circuit, and/or a data processing device. The memories may include a Read-Only Memory (ROM), a Random Access Memory (RAM), a flash memory, a memory card, a storage medium and/or another storage device. The RF units may include a baseband circuit for processing a wireless signal. When an embodiment is embodied as software, the described scheme may be embodied as a module (process, function, or the like) that executes the described function. The module may be stored in a memory, and may be executed by a processor. The memory may be disposed inside or outside the processor, and may be connected to the processor through various well-known means.

In the described exemplary system, although methods are described based on a flowchart as a series of steps or blocks, aspects of the present invention are not limited to the sequence of the steps and a step may be executed in a different order or may be executed in parallel with another step. In addition, it is apparent to those skilled in the art that the steps in the flowchart are not exclusive, and another step may be included or one or more steps of the flowchart may be omitted without affecting the scope of the present invention.

What is claimed is:

1. A method of controlling transmit power for a device-to-device (D2D) communication, the method comprising:
receiving, at a User Equipment (UE), a radio resource control (RRC) message transmitted from an evolved NodeB (eNB), the RRC message comprising power information for the UE, the power information comprising D2D maximum transmit power for a first D2D transmission through a first serving cell and maximum transmit power for an uplink transmission to the eNB through a second serving cell, wherein the uplink transmission to the eNB through the second serving cell comprises a Physical Uplink Shared Channel (PUSCH) transmission;
determining whether the first D2D transmission through the first serving cell and a second D2D transmission overlap in a subframe i, wherein the first D2D transmission is prioritized over the second D2D transmission;
determining, based on the priority of the first D2D transmission, the first D2D transmission in the subframe i;
determining whether the first D2D transmission through the first serving cell and the PUSCH transmission to the eNB through the second serving cell overlap in the subframe i;
based on allocation of transmit power of the overlapped PUSCH transmission to the eNB through the second serving cell in the subframe i, adjusting transmit power of the first D2D transmission through the first serving cell in the subframe i, wherein the adjusted transmit power of the first D2D transmission is greater than zero; and
performing the first D2D transmission through the first serving cell and the PUSCH transmission to the eNB through the second serving cell in the subframe i,
wherein the transmit power of the overlapped PUSCH transmission to the eNB through the second serving cell in the subframe i is prioritized over the transmit power of the first D2D transmission through the first serving cell in the subframe i.

2. The method of claim 1, wherein the first D2D transmission through the first serving cell in the subframe i comprises at least one of:
a D2D discovery channel,
a D2D scheduling assignment (SA) channel, and
a D2D data channel.

3. The method of claim 2, wherein the transmit power of the first D2D transmission through the first serving cell in the subframe i is adjusted such that the transmit power of the first D2D transmission through the first serving cell in the subframe i does not exceed remaining power being calculated by subtracting the transmit power of the overlapped PUSCH transmission to the eNB through the second serving cell in the subframe i from maximum transmit power configured for the UE.

4. The method of claim 1, wherein the D2D maximum transmit power for the first D2D transmission through the first serving cell is determined based on a coverage of a D2D channel.

5. The method of claim 1, further comprising:
adjusting transmit power of a D2D transmission through the first serving cell in a subframe j such that the transmit power of the D2D transmission through the first serving cell in the subframe j does not exceed remaining power being calculated by subtracting transmit power of a D2D transmission through a third serving cell in the subframe j from maximum transmit power configured for the UE.

6. The method of claim 5, wherein the transmit power of the D2D transmission through the third serving cell in the subframe j is prioritized over the transmit power of the D2D transmission through the first serving cell in the subframe j.

7. The method of claim 1, wherein the priority of the first D2D transmission is determined based on at least one of a D2D channel type and a D2D mode.

8. The method of claim 7, wherein a D2D scheduling assignment (SA) channel in D2D Mode 1 transmission is prioritized over a D2D SA channel in D2D Mode 2 transmission or over a D2D data channel.

9. A user equipment (UE) to control transmit power for a device-to-device (D2D) communication, the UE comprising:
- a transceiver to receive a radio resource control (RRC) message transmitted from an evolved NodeB (eNB), the RRC message comprising power information for the UE, the power information comprising D2D maximum transmit power for a first D2D transmission through a first serving cell and maximum transmit power for an uplink transmission to the eNB through a second serving cell, wherein the uplink transmission to the eNB through the second serving cell comprises a Physical Uplink Shared Channel (PUSCH) transmission; and
- a processor configured to determine whether the first D2D transmission through the first serving cell and a second D2D transmission overlap in a subframe i, wherein the first D2D transmission is prioritized over the second D2D transmission,
- wherein the processor determines, based on the priority of the first D2D transmission, the first D2D transmission in the subframe i,
- wherein the processor determines whether the first D2D transmission through the first serving cell and the PUSCH transmission to the eNB through the second serving cell overlap in the subframe i,
- wherein the processor adjusts transmit power of the first D2D transmission through the first serving cell in the subframe i based on allocation of transmit power of the overlapped PUSCH transmission to the eNB through the second serving cell in the subframe i, wherein the adjusted transmit power of the first D2D transmission is greater than zero,
- wherein the transceiver performs the first D2D transmission through the first serving cell and the PUSCH transmission to the eNB through the second serving cell in the subframe i, and
- wherein the transmit power of the overlapped PUSCH transmission to the eNB through the second serving cell in the subframe i is prioritized over the transmit power of the first D2D transmission through the first serving cell in the subframe i.

10. The UE of claim 9, wherein the first D2D transmission through the first serving cell in the subframe i comprises at least one of:
- a D2D discovery channel,
- a D2D scheduling assignment (SA) channel, and
- a D2D data channel.

11. The UE of claim 10, wherein the processor adjusts the transmit power of the first D2D transmission through the first serving cell in the subframe i such that the transmit power of the first D2D transmission through the first serving cell in the subframe i does not exceed remaining power being calculated by subtracting the transmit power of the overlapped PUSCH transmission to the eNB through the second serving cell in the subframe i from maximum transmit power configured for the UE.

12. The UE of claim 9, wherein the D2D maximum transmit power for the first D2D transmission through the first serving cell is determined based on a coverage of a D2D channel.

13. The UE of claim 9, wherein the processor adjusts transmit power of a D2D transmission through the first serving cell in a subframe j such that the transmit power of the D2D transmission through the first serving cell in the subframe j does not exceed remaining power being calculated by subtracting transmit power of a D2D transmission through a third serving cell in the subframe j from maximum transmit power configured for the UE.

14. The UE of claim 13, wherein the processor prioritizes the transmit power of the D2D transmission through the third serving cell in the subframe j over the transmit power of the D2D transmission through the first serving cell in the subframe j.

15. The UE of claim 9, wherein the processor determines the priority of the first D2D transmission based on at least one of a D2D channel type and a D2D mode.

16. The UE of claim 15, wherein the processor prioritizes a D2D scheduling assignment (SA) channel in D2D Mode 1 transmission over a D2D SA channel in D2D Mode 2 transmission or over a D2D data channel.

* * * * *